United States Patent
Pomeroy et al.

(10) Patent No.: US 11,516,177 B1
(45) Date of Patent: *Nov. 29, 2022

(54) DETECTING AND REMEDIATING NON-RESPONSIVE CUSTOMER PREMISE EQUIPMENT

(71) Applicant: CSC HOLDINGS, LLC, Bethpage, NY (US)

(72) Inventors: John Patrick Pomeroy, Lake Grove, NY (US); Eric Joseph Godas, Smithtown, NY (US); David Wang, Port Jefferson Station, NY (US); Andy Zovich, New Hyde Park, NY (US); Kevin Fowler, Bayshore, NY (US); Paul Hess, Rocky Point, NY (US)

(73) Assignee: CSC Holdings, LLC, Bethpage, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/933,032

(22) Filed: Jul. 20, 2020

Related U.S. Application Data (63) Continuation of application No. 16/056,294, filed on Aug. 6, 2018, now Pat. No. 10,721,034, which is a
(Continued)

(51) Int. Cl.
*H04L 61/103* (2022.01)
*H04L 43/0811* (2022.01)
(Continued)

(52) U.S. Cl.
CPC ............ *H04L 61/103* (2013.01); *H04L 1/24* (2013.01); *H04L 12/2898* (2013.01);
(Continued)

(58) Field of Classification Search
CPC ..... H04L 61/103; H04L 1/24; H04L 12/2898; H04L 41/0672; H04L 43/0811;
(Continued)

(56) References Cited

U.S. PATENT DOCUMENTS

| | | | | |
|---|---|---|---|---|
| 6,775,276 B1* | 8/2004 | Beser | ................. | H04L 61/2015 370/389 |
| 6,986,157 B1* | 1/2006 | Fijolek | .................... | H04L 67/16 725/111 |
| 7,290,046 B1* | 10/2007 | Kumar | ................ | H04L 12/2801 725/111 |
| 8,279,759 B1* | 10/2012 | Jones | .................... | H04L 43/106 709/224 |
| 8,831,563 B2* | 9/2014 | Martell | ................... | H04W 4/02 455/418 |

(Continued)

OTHER PUBLICATIONS

"CPE Inability to Connect"; Cisco; Internet document retrieved on May 11, 2016; updated (authored) on Oct. 4, 2005; http://www.cisco.com/c/en/us/support/docs/broadband-cable/cable-modems/15036-cpe-no-connect.html.
(Continued)

*Primary Examiner* — Benjamin H Elliott, IV
(74) *Attorney, Agent, or Firm* — Sterne, Kessler, Goldstein & Fox P.L.L.C.

(57) ABSTRACT

In a cable network, embodiments detect and remediate a non-responsive customer premise equipment (CPE) device in a customer's premise with minimal or no interaction with a customer. Embodiments may detect and remediate a non-responsive CPE device without rebooting the non-responsive CPE device or the associated cable modem. Embodiments include troubleshooting a data link layer (e.g., Open System Interconnection (OSI) layer 2, or media access control (MAC) layer) and a network layer (e.g., OSI layer 3, or Internet layer) between a service operator network and the non-responsive CPE device. Embodiments include a guided integration and a proactive integration method, computer program product, and system to reduce and/or eliminate the need for a customer service representative to reboot a cable
(Continued)

modem, and/or for a customer to reboot a non-responsive CPE device resulting in a fast and less disruptive service experience for the customer.

20 Claims, 5 Drawing Sheets

Related U.S. Application Data continuation of application No. 15/389,027, filed on Dec. 22, 2016, now Pat. No. 10,069,605, which is a continuation of application No. 14/193,826, filed on Feb. 28, 2014, now Pat. No. 9,577,797.

(51) Int. Cl.
| | |
|---|---|
| *H04L 41/0654* | (2022.01) |
| *H04L 43/0817* | (2022.01) |
| *H04L 43/10* | (2022.01) |
| *H04L 1/24* | (2006.01) |
| *H04L 12/28* | (2006.01) |
| *H04L 61/5007* | (2022.01) |
| *H04L 101/622* | (2022.01) |

(52) U.S. Cl.
CPC ...... *H04L 41/0672* (2013.01); *H04L 43/0811* (2013.01); *H04L 43/0817* (2013.01); *H04L 43/10* (2013.01); *H04L 61/5007* (2022.05); *H04L 2101/622* (2022.05)

(58) Field of Classification Search
CPC . H04L 43/0817; H04L 43/10; H04L 61/2007; H04L 61/6022; H04L 12/2885; H04L 12/2801
See application file for complete search history.

(56) References Cited

U.S. PATENT DOCUMENTS

| | | | | |
|---|---|---|---|---|
| 8,886,834 B2* | 11/2014 | Singh | ............... | H04L 41/0663 |
| | | | | 709/245 |
| 9,577,797 B1* | 2/2017 | Pomeroy | ............. | H04L 12/2898 |
| 10,069,605 B1* | 9/2018 | Pomeroy | ............. | H04L 12/2898 |
| 10,721,034 B1* | 7/2020 | Pomeroy | .................. | H04L 1/24 |
| 2002/0062450 A1* | 5/2002 | Carlson | .................. | H04L 63/10 |
| | | | | 726/26 |
| 2004/0258003 A1* | 12/2004 | Kokot | .................. | H04L 12/185 |
| | | | | 370/254 |
| 2006/0031921 A1* | 2/2006 | Danforth | ................ | H04L 63/10 |
| | | | | 726/1 |
| 2006/0120719 A1* | 6/2006 | Bradford | ................ | H04B 10/00 |
| | | | | 398/31 |
| 2008/0267215 A1* | 10/2008 | Blackburn | .......... | H04M 3/2245 |
| | | | | 370/468 |
| 2010/0202462 A1* | 8/2010 | Riddel | ............... | H04L 12/2801 |
| | | | | 370/400 |
| 2011/0004893 A1* | 1/2011 | Borislow | ........... | H04N 21/4405 |
| | | | | 455/457 |
| 2011/0286345 A1* | 11/2011 | Goue | ..................... | H04L 1/205 |
| | | | | 370/252 |
| 2014/0269470 A1* | 9/2014 | Hybertson | ................ | G06F 1/30 |
| | | | | 370/311 |

OTHER PUBLICATIONS

"Removing Cable Modem and CPE Entries from the CMTS"; Cisco; Internet document retrieved on May 11, 2016; updated (authored) on Oct. 4, 2005; http://www.cisco.com/c/en/us/support/docs/broadband-cable/cable-modems/4663-cm-cpe-entries-removed.html.

* cited by examiner

DETECTING AND REMEDIATING NON-RESPONSIVE CUSTOMER PREMISE EQUIPMENT

CROSS-REFERENCE TO RELATED APPLICATIONS

This application is a continuation of U.S. application Ser. No. 16/056,294, filed Aug. 6, 2018, entitled Detection and Remediation of Non-Responsive Customer Premises Equipment, which is a continuation of U.S. application Ser. No. 15/389,027, filed Dec. 22, 2016, entitled System and Method for the Detection and Remediation of Non-Responsive Customer Premises Equipment, which is a continuation of U.S. application Ser. No. 14/193,826, filed Feb. 28, 2014, entitled System and Method for the Detection and Remediation of Non-Responsive Customer Premises Equipment, all of which are incorporated herein by reference in their entireties.

BACKGROUND

Field

Embodiments generally relate to cable networks and more specifically to non-responsive customer premise equipment (CPE) in cable networks.

Background Art

Being able to troubleshoot a non-responsive Customer Premise Equipment (CPE) device associated with a cable modem is a critical capability for cable service operations. Unfortunately, the determination and correction of a non-responsive CPE device is an intrusive, disruptive, and time consuming process.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
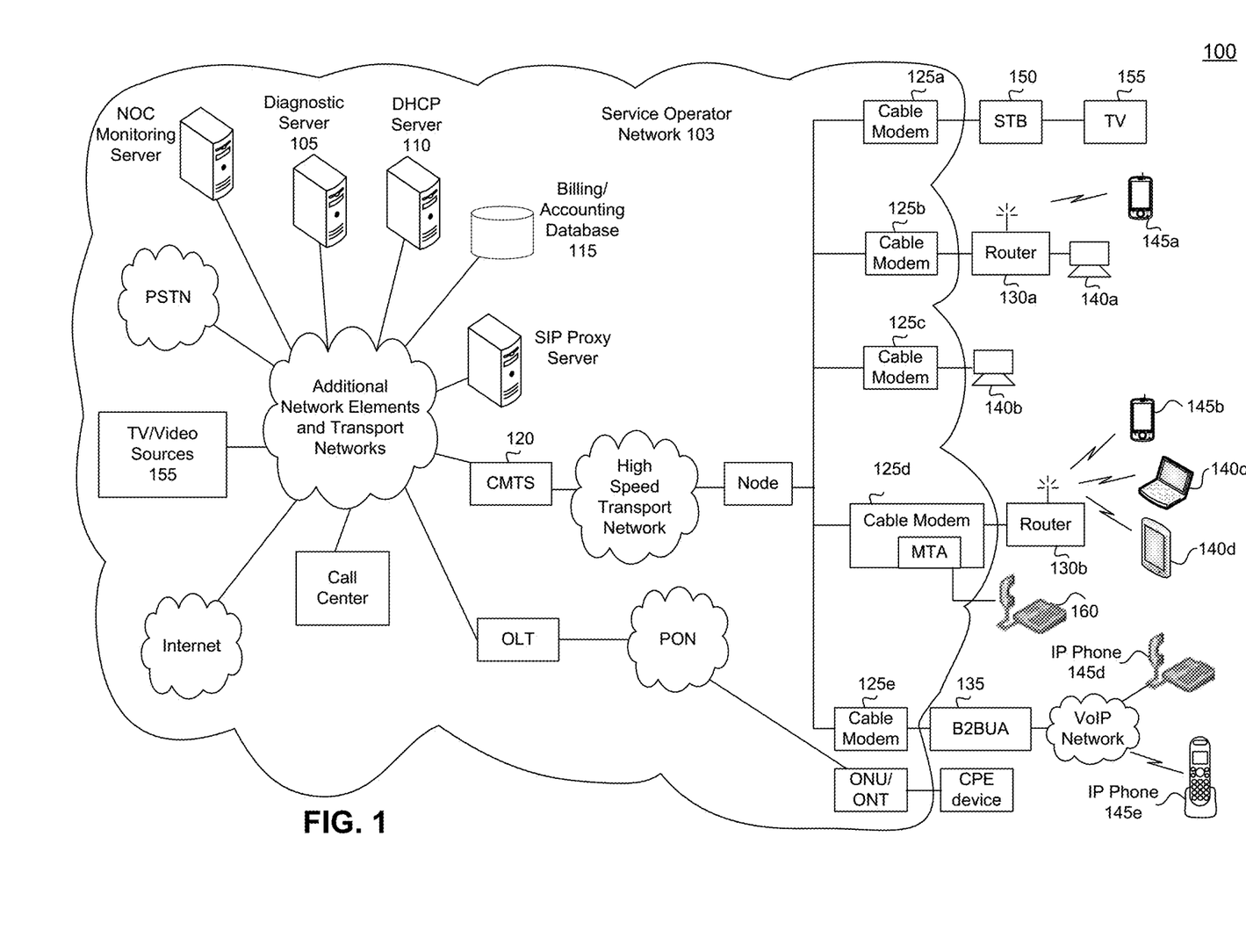
FIG. 1 illustrates an example system according to an embodiment.

FIG. 1 illustrates an example system 100 according to an embodiment. System 100 such as a cable system includes a variety of network elements and transport networks that together support a variety of services including but not limited to television and video services, Internet access, and Voice over Internet Protocol (VoIP) services. System 100 includes service operator network 103 that is connected to many CPE devices on the customer premises such as set top box (STB) 150, routers 130a and 130b, a computing device 140b, and a business to business user agent (B2BUA) 135; these are described further below. In another example, a cable modem may be owned by a customer and is not a part of service operator network 103. Service operator network 103 comprises network elements and transport networks including but not limited to servers, databases including billing/accounting database 115, a call center, e.g., a technical services group (TSG), TV and video sources 155, as well as access to the Public Switched Telephone Network (PSTN) and the Internet. Examples of servers include but are not limited to a Network Operation Center (NOC) monitoring server that supports network management, a Dynamic Host Configuration Protocol (DHCP) server 110 that supports Internet Protocol (IP) address management, a Session Initiation Protocol (SIP) proxy server that supports VoIP services, and a diagnostic server 105 that may support for example, network diagnostic tools and/or customer service representative system functions. While FIG. 1 shows some network elements, the service operator network 103 may include one or more of the same types or different types of network elements, e.g., service operator network 103 may include more than one DHCP server 110.

Service operator network 103 includes one or more cable modem termination system (CMTS) 120 although only one is shown in FIG. 1. A CPE device communicates with service operator network 103 using an associated cable modem 125 and an associated CMTS 120. For example, a television program is broadcast from TV/Video sources 155 through additional network elements and transport networks to CMTS 120 and cable modem 125a to CPE device, STB 150, in a subscriber's premises that is viewed on television 155. And in the reverse direction, cable modem 125a may forward data from STB 150 via CMTS 120 to a server. For example, cable modem 125a may forward a request for an IP address, e.g., an IP address lease request, from STB 150 via CMTS 120 to DHCP server 110. Note that cable modems 125 do not communicate with each other. For example, cable modem 125a does not communicate with cable modem 125b. CMTS 120 is connected to a node by a high-speed, two-directional transport network such as a hybrid fibrecoaxial (HFC) network that includes optical fiber and coaxial cable. A node connects to one or more cable modems such as cable modems 125*a*, 125*b*, 125*c*, 125*d*, and 125*e*. A node may convert optical signals to electrical signals sent to cable modems 125*a*, 125*b*, 125*c*, 125*d*, and 125*e* and may convert electrical signals from cable modems 125 to optical signals that are sent over the high speed transport network to CMTS 120.

Additional embodiments will be apparent to persons skilled in the relevant art(s) based on the teachings contained herein. For example, as shown in FIG. 1, a customer premise network access endpoint may be an Optical Network Unit (ONU) or an Optical Network Terminal (ONT) connected to a CPE device. In addition, the ONU/ONT may connect to a Passive Optical Network (PON) and a network aggregation point such as an Optical Line Terminal (OLT).

Cable modems 125 may connect to a variety of CPE devices that may be associated with an IP address including, but are not limited to the following: STB 150 that may connect to television 155; routers 130*a* and 130*b* that may include a wireless and/or wired home network such as a local area network; a computing device 140*b* that may include but is not limited to a personal computer, a smart TV, or a laptop; and a B2BUA 135 that supports a VoIP network for IP telephones 145*d* and 145*e*. IP telephone 145*e* may be for example, a wireless IP telephone. Routers 130*a* and 130*b* support equipment such as computing devices 140*a*, 140*c*, 140*d* that may include but are not limited to personal computers, laptops, and tablets, as well as mobile cellular devices 145*a* and 145*b*.

Cable modems may be integrated with components such as a STB or a Multimedia Terminal Adapter (MTA) which is a VoIP adapter. For example, standard telephones may connect to an MTA to obtain VoIP service. For example, cable modem 125*d* includes an MTA, and router 130*b* and telephone 160 connect to cable modem 125*d*; note that telephone 160 may be a cordless telephone.

Cable modems may include an Ethernet interface, a universal serial bus (USB) interface, or both. A customer receives service via a CPE device that is connected to an interface of a cable modem. Some cable modems may support a toggle interface feature. When a cable modem supports a toggle interface feature, the cable modem responds to a service operator's toggle signal to remotely disable the state of an interface as well as drop or break a logical connection with a CPE device. The service operator may also send an enable toggle signal to the associated cable modem to enable the state of the interface and allow a reconnection with the CPE device.

A CPE device may be non-responsive for many reasons, including but not limited to the following: the CPE device may be offline; the CPE device may be physically disconnected; the CPE device may be placed in a disabled state by the service operator for any warranted condition; the CPE device may be moved to a different location where the CPE device is physically connected but not working. Examples of warranted conditions that may result in a service operator sending a disable toggle signal to a CPE device include but are not limited to the following: non-payment of services, detection of a modem participating in inappropriate or destructive actions such as a denial of service (DoS), a distributed denial of service (DDoS), or a spam mailing. An example of a CPE device being moved to a different location follows: when a CPE device is connected to a cable modem, the CPE device may register with a first DHCP server. If the CPE device is moved from one location to a new geographic location, the CPE device may register with a different DHCP server. The first DHCP server may observe that the CPE device's IP address lease expires indicating a potential problem. The situation may be compounded if a different CPE device is connected at the original location.

When a CPE device is non-responsive, a customer may contact a customer service representative process (CSRP) to resolve the problem. A CSRP includes but is not limited to any trouble shooting process. For example, a CSRP may be one of the following: a process conducted by a person in a call center; a web portal process responding to a customer self-care portal interaction, e.g., a self-care web portal accessed by a customer using a mobile cellular device such as a smart phone; or an expert system such as an interactive voice response (IVR) system responding to a customer call. The CSRP typically instructs the customer to reboot the non-responsive CPE device, e.g., STB 150, router 130, computing device 140*b*, or B2BUA 135, and/or reboot the cable modem associated with the non-responsive CPE device. Both reboots are an intrusive, disruptive, and time consuming process. This can be especially disruptive if a customer is calling the CSRP via cable modem 125*d* that includes an MTA as shown in FIG. 1. When cable modem 125*d* is rebooted, the VoIP customer call will be dropped making assistance and resolution difficult.

Embodiments detect and remediate a non-responsive CPE device in a customer's premise with minimal or no interaction with a customer. Embodiments may detect and remediate a non-responsive CPE device without rebooting the non-responsive CPE device or the associated cable modem. Embodiments include troubleshooting a data link layer (e.g., Open System Interconnection (OSI) layer 2, or media access control (MAC) layer) and a network layer (e.g., OSI layer 3, or Internet layer) between service operator network 103 and the non-responsive CPE device. Embodiments include a guided integration and a proactive integration method, computer program product, and system to reduce and/or eliminate the need for a CSRP to reboot a cable modem 125, and/or for a customer to reboot a non-responsive CPE device resulting in a fast and less disruptive service experience for the customer.

Figure 2:
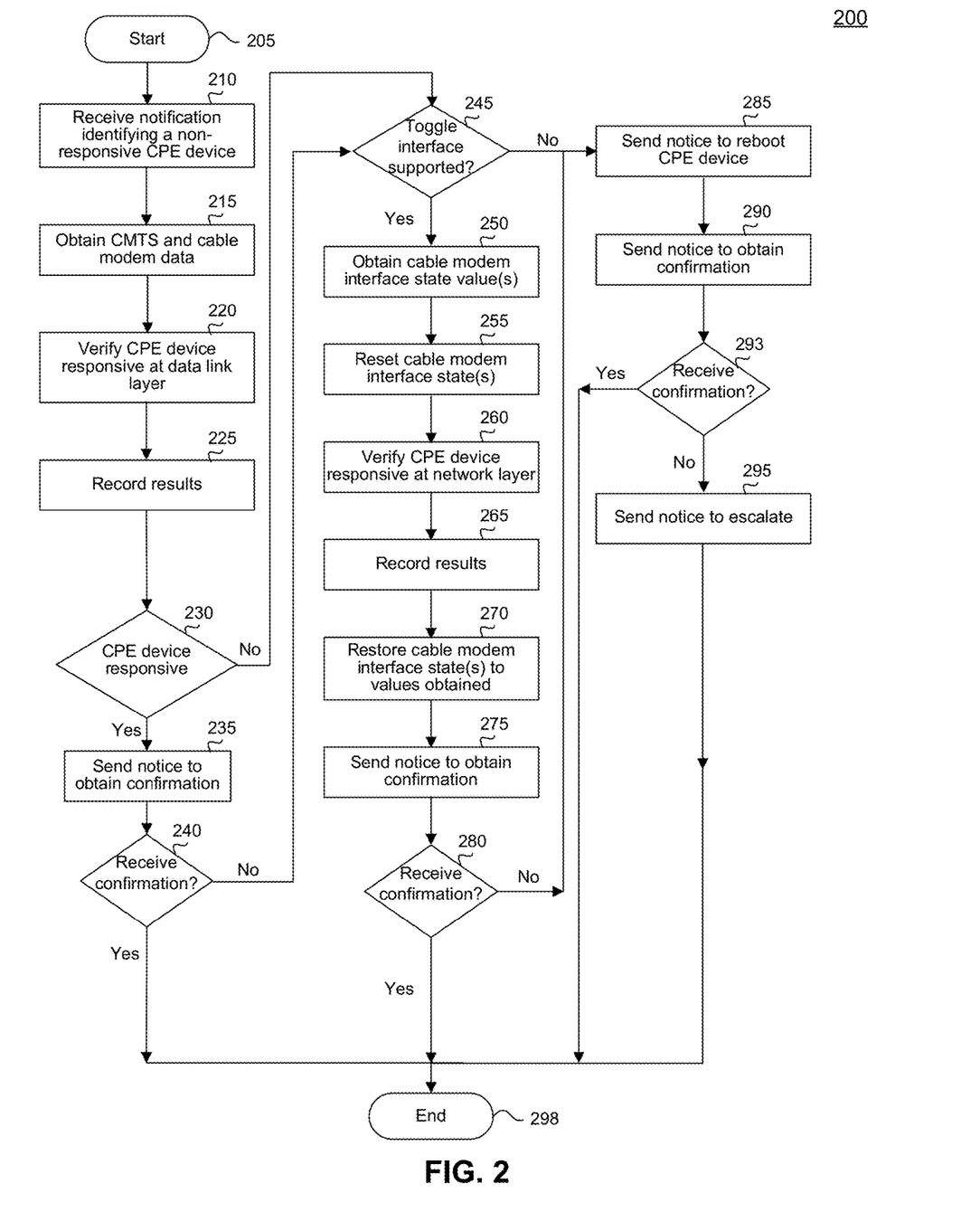
FIG. 2 illustrates a method demonstrating guided integration according to an embodiment.
Figure 5:
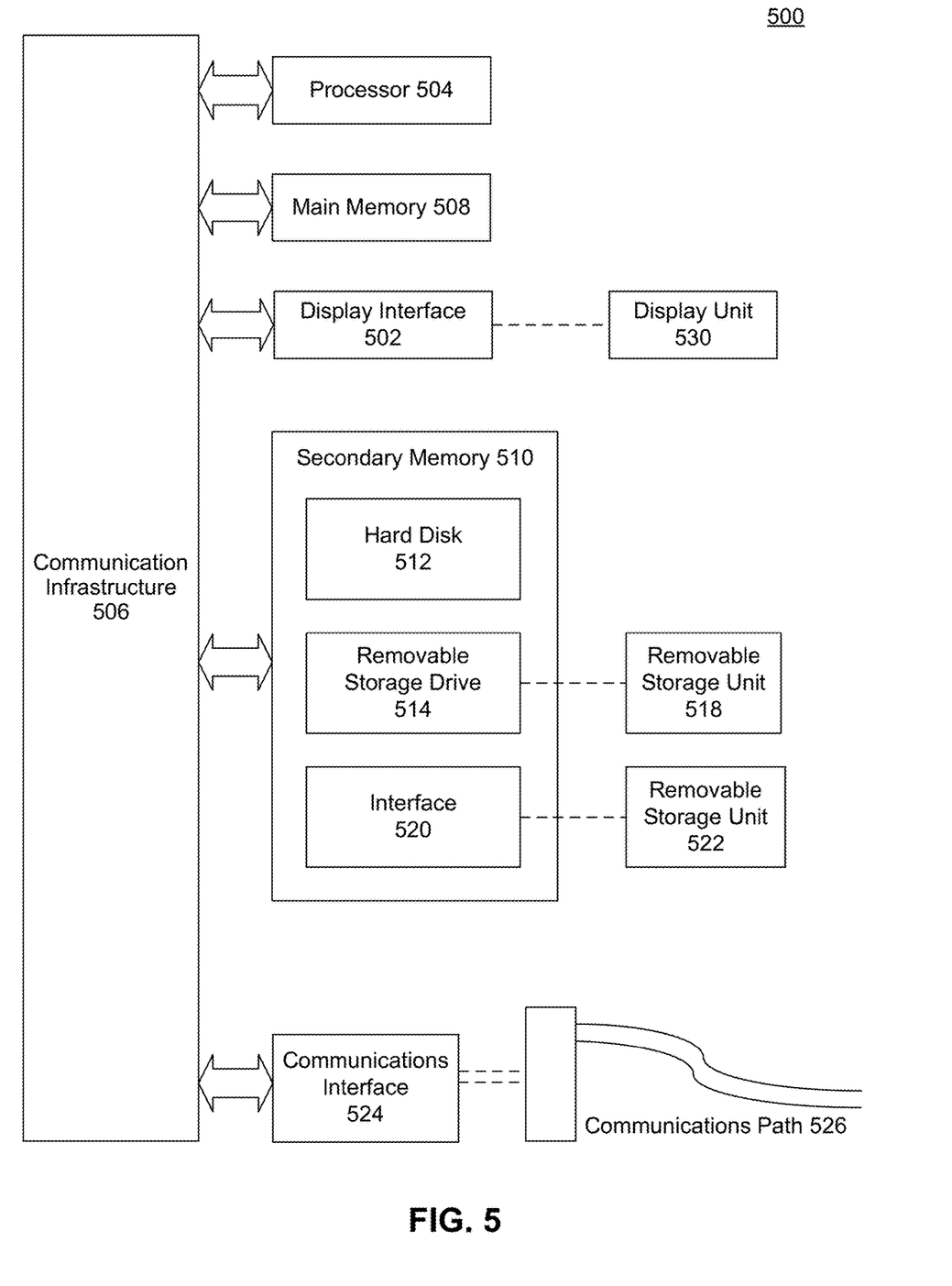
FIG. 5 illustrates an example computer system which can be used to implement an embodiment.

FIG. 2 illustrates a method 200 demonstrating guided integration according to an embodiment. When a guided integration is implemented, a non-responsive CPE device may be detected and remediated with interactions between a CSRP and a customer. For example, when a customer experiences a service problem which may be a non-responsive CPE, the customer contacts a CSRP; the CSRP may utilize method 200 to trouble shoot and resolve problems. It is to be appreciated that operations in method 200 may be performed in a different order than shown, and method 200 may not include all operations shown. Method 200 may be implemented by software, firmware, hardware, or a combination thereof. FIG. 5 described below, illustrates an example computer system 500 in which some embodiments such as method 200, or portions thereof, may be implemented as computer-readable code. For ease of discussion, and without limitation, method 200 will be described in terms of elements shown in FIG. 1. In one example, system 100 may be used to perform method 200. For example, method 200, or portions thereof, may be implemented on diagnostic server 105.

Method 200 begins at step 205 and proceeds to step 210.

In step 210, method 200 receives a notification identifying a non-responsive CPE device and the cable modem associated with the non-responsive CPE device. For example, when a customer contacts a CSRP (e.g., a person in a call center, or a CSRP system) and provides information about their account, the CSRP may retrieve an identifier of the cable modem associated with the non-responsive CPE device as well as an identifier of the CPE device from an billing/accounting database, and send the identifiers to method 200, e.g., send the identifiers to method 200 implemented on diagnostic server 105. As an example, the CSRP may retrieve a MAC address and/or an IP address identifying cable modem 125*a* and a MAC address and/or an IP address identifying STB 150 from billing/accounting database 115.

In step 215, method 200 obtains CMTS and cable modem data. For example, using the cable modem identifier, method 200 may poll a bridge table in the cable modem to obtain information including but not limited to at least one of the following: an identification of the CMTS associated with the non-responsive CPE device; detailed data about the type of the cable modem; a MAC address of the cable modem; an IP address of the cable modem; a MAC address of the non-responsive CPE device, or an IP address of the non-responsive CPE device. As an example, method 200 polls a bridge table in cable modem 125*a* to obtain at least one of an identifier for CMTS 120, detailed data about the type of cable modem that cable modem 125 is, an IP address or a MAC address for cable modem 125*a*, as well as an IP address or a MAC address for STB 150. Also, if a cable modem, e.g., cable modem 125*d*, also has an embedded MTA, then the results may also include a MAC address or an IP address of the MTA.

It is possible that a customer may replace their CPE device with a different CPE device without informing a service operator. When this occurs, the results of the bridge table poll may include a MAC address or an IP address of the different CPE device instead of the originally reported non-responsive CPE device. If this occurs, method 200 proceeds utilizing the obtained MAC or IP address of the different CPE device. For ease of discussion, and not a limitation, the remainder of method 200 is described assuming that the MAC and IP address of the originally reported non-responsive CPE device is obtained.

In step 220, method 200 verifies that the non-responsive CPE device, e.g., STB 150, is responsive at the data link layer, e.g., OSI layer 2 or MAC layer. Details of this step are described in FIG. 3 below.

In step 225, method 200 records the results of the data link layer verification. For example, method 200 may update an event record to indicate whether a CPE device is responsive at the data link layer. The indication may be the result of a query of an Address Resolution Protocol (ARP) table entry in a CMTS associated with the non-responsive CPE device to see if a MAC address has been restored for the non-responsive CPE device. Data is collected and recorded to assist the CSRP with trouble shooting resolution as well as data analysis and reports, e.g., for subsequent network management analysis. As an example, the indication may be the result of a query of an ARP table entry in CMTS 120 associated with STB 150 to determine if the entry includes a restored MAC address.

In step 230, a determination is made whether the CPE device, e.g., STB 150, was responsive. The determination for example, indicates whether the ARP table entry includes a valid MAC address for the CPE device. If a valid MAC address is in the ARP table entry, method 200 continues to step 235. Otherwise, method 200 continues to step 245.

In step 235, method 200 sends a notice to obtain confirmation that the CPE device is responsive at the data link layer. For example, a message may be sent to a CSRP requesting confirmation from the customer that the CPE device, e.g., STB 150, is responsive, e.g., a CSRP may receive a message to ask the customer if their Internet access has resumed.

In step 240, a determination is made whether method 200 receives a confirmation that the CPE device is responding. If a confirmation is received, method 200 proceeds to step 298 and ends. If a confirmation is not received, method 200 continues to step 245.

In step 245, using the detailed data about the type of the cable modem obtained in step 215, a determination is made whether the cable modem, e.g., cable modem 125*a*, supports a toggle interface feature. The detailed data about the type of the cable modem obtained in step 215, includes but not is not limited to a manufacturer, a make, a model number, a date, a software version and/or a protocol standard. The detailed data about the cable modem is then compared with a table of information associated with cable modems that are known to support the toggle interface feature. For example, when there is a match in the table, the cable modem is recognized as a type of cable modem that supports the toggle interface feature.

The information in the table may be stored in a database in service operator network 103 and accessed by method 200, for example. The information in the table may be updated automatically, e.g., received from a network element in service operator network 103 that tests and determines whether a network endpoint such as a cable modem or ONU/ONT supports a toggle interface feature, or manually entered, e.g., via a network element console in service operator network 103. The information in the table may be a updated according to a programmable schedule, e.g., weekly, based on time of day, or on demand.

If the cable modem supports a toggle interface, e.g., a match is found between the detailed data about the cable modem and the information in the table, method 200 proceeds to step 250. If a toggle interface feature is not supported, e.g., a match is not found between the detailed data about the cable modem and the information in the table, method 200 proceeds to step 285.

In step 250, method 200 obtains the administrative state(s) of the interfaces of the cable modem such as an Ethernet interface and/or USB interface. For example, method 200 may poll the cable modem associated with the non-responsive CPE device to capture the current value of an administrative state of at least one or both of an Ethernet interface or a USB interface of the cable modem. Since the cable modem supports the toggle interface feature, the administrative state(s) of the interface(s) may be disabled or set to down indicating that services are being withheld, e.g., due to non-payment of services, and the logical connection is severed. Alternatively, the administrative state(s) of the interface(s) may be enabled, or set to up indicating that services are being provided. As an example, method 200 may poll cable modem 125*a* to capture the current value of an administrative state(s) of the interface(s).

In step 255, method 200 resets the connection between the cable modem and the non-responsive CPE device. Method 200, e.g., implemented on diagnostic server 105, may send a disable toggle signal to disable an interface in the cable modem to which the non-responsive CPE device is connected. In response to receiving the disable toggle signal, an administrative state of the interface of the cable modem is disabled, and the cable modem stops sending and receiving data traffic, e.g., data packets, over the interface to and from the CPE device. In addition, the cable modem severs the logical connection between the cable modem and the CPE device, e.g., the cable modem stops sending signals such as Fast Link Pulse (FLP) signals to the CPE device. Even though the CPE device is physically connected to the interface of the cable modem, the interface of the cable modem is disabled, the logical connection is dropped or broken, and the customer will not receive services.

After a settable time period, e.g., 20 seconds, method 200 may send an enable toggle signal to the cable modem. In response to receiving the enable toggle signal, the administrative state of the interface of the cable modem is set to enabled and the cable modem supports a logical reconnection, e.g., the cable modem may resume sending FLP signals over the interface to the CPE device causing the CPE device to reinitialize the logical connection with the cable modem. Once the connection is re-established, the CPE device may resume sending data traffic to and from the cable modem. For example, the CPE device may follow DHCP DORA procedures to obtain a new IP address from DHCP server 110 in service operator network 103 to send and receive data traffic.

As an example, method 200 may send a disable toggle signal to cable modem 125a to disable the state of an interface to which STB 150 is connected, and drop the logical connection between cable modem 125a and STB 150. After a period of time, method 200 may send an enable toggle signal to cable modem 125a to enable the state of the interface and make a logical reconnection with STB 150. For example, STB 150 may request and obtain a new IP address, from DHCP server 110. In another embodiment, method 200 may include one process that sends a disable toggle signal to cable modem 125a, waits a settable time period, and then sends an enable toggle signal to cable modem 125a.

In step 260, method 200 verifies the responsiveness of the CPE device at a network layer (e.g., OSI layer 3, or Internet layer). For example, method 200 may query a system including but not limited to a DHCP system associated with the non-responsive CPE device, to obtain a valid IP address associated with the non-responsive CPE device. If a valid IP address is obtained, the CPE device is responsive at the network layer. As an example, method 200 may query a DHCP system on DHCP server 110 to determine if STB 150 is associated with a valid IP address. If a valid IP address is obtained, STB 150 is responsive at the network layer.

In step 265, method 200 records the results of the network layer verification, e.g., update an event record to indicate whether the CPE device is responsive at the network layer. Data is collected and recorded to assist the CSRP with trouble shooting resolution as well as data analysis and reports, e.g., for subsequent network management analysis. The records may include at least one of the following: a MAC address of the cable modem; a MAC address of the CPE device; an IP address of the cable modem; an IP address of the CPE device; an IP address of the CMTS; a length of time that an IP address of the CPE device has been valid, e.g., lease time of the IP address of the CPE device; a date and a time that the result of the query is received; an indication of whether the cable modem supports the toggle interface feature; or a fully qualified domain name (FQDN) of the CPE device that uniquely identifies the CPE device. As an example, the records may include at least one of the MAC address or the IP address of cable modem 125a, the MAC address or the IP address of STB 150, or a length of time that an IP address of STB 150 has been valid, e.g., the lease time for the IP address of STB 150, the date and time the result of the query in step 260 is received, an indication of whether cable modem 125a supports the toggle interface feature, or the FQDN of the STB 150.

In step 270, method 200 restores the administrative state of at least one of the Ethernet interface or the USB interface to the value obtained in step 250. In assisting a customer to troubleshoot a problem, a CSRP may assist with diagnosing, but because the administrative state of the cable modem's interfaces may be based on a billing/payment issue, the method 200 returns the administrative state to the value obtained in step 250. If for example, the administrative state is restored to "disabled", method 200 may send a notice to the CSRP to recommend that the customer contact a billing or accounting department to resolve payment issues that may lead to the enabling of the interface(s) administrative state(s) and services. As an example, method 200 restores the administrative state(s) of the interface(s) of cable modem 125a to the value(s) obtained in step 250.

In step 275, method 200 sends a notice to obtain confirmation that the CPE device is responsive. For example, a message may be sent to a CSRP requesting confirmation from the customer that the CPE device, e.g., STB 150, is responding, e.g., a CSRP may receive a notice to ask the customer if Internet access has resumed.

In step 280, a determination is made whether method 200 receives a confirmation that the CPE device, e.g., STB 150, is responding at the network layer. If a confirmation is received, method 200 proceeds to step 298 and ends. If a confirmation is not received, method 200 continues to step 285.

In step 285, method 200 sends a notice to reboot the CPE device. At this point the CPE device is still not responsive and method 200 may for example, send a notice to the CSRP to instruct the customer to turn off the CPE device, e.g., STB 150, wait a period of time, and then turn on the CPE device.

In step 290, method 200 sends a notice to obtain confirmation that the CPE device is responsive. For example, a message may be sent to a CSRP requesting confirmation from the customer that the CPE device is responding, e.g., a CSRP may receive a notice to ask the customer if Internet access has resumed.

In step 293, a determination is made whether method 200 receives a confirmation that the CPE device, e.g., STB 150, is responding. If a confirmation is received, method 200 proceeds to step 298 and ends. If a confirmation is not received, method 200 continues to step 295.

In step 295, method 200 sends a notice to escalate the problem. At this point the problem may be escalated to another level of assistance. For example, method 200 may send a notice to a CSRP to have the trouble escalated according to standard procedures. Standard procedures may include, for example, contacting the customer to provide assistance, or scheduling a technician to visit the customer.

In step 298, method 200 ends.

Figure 3:
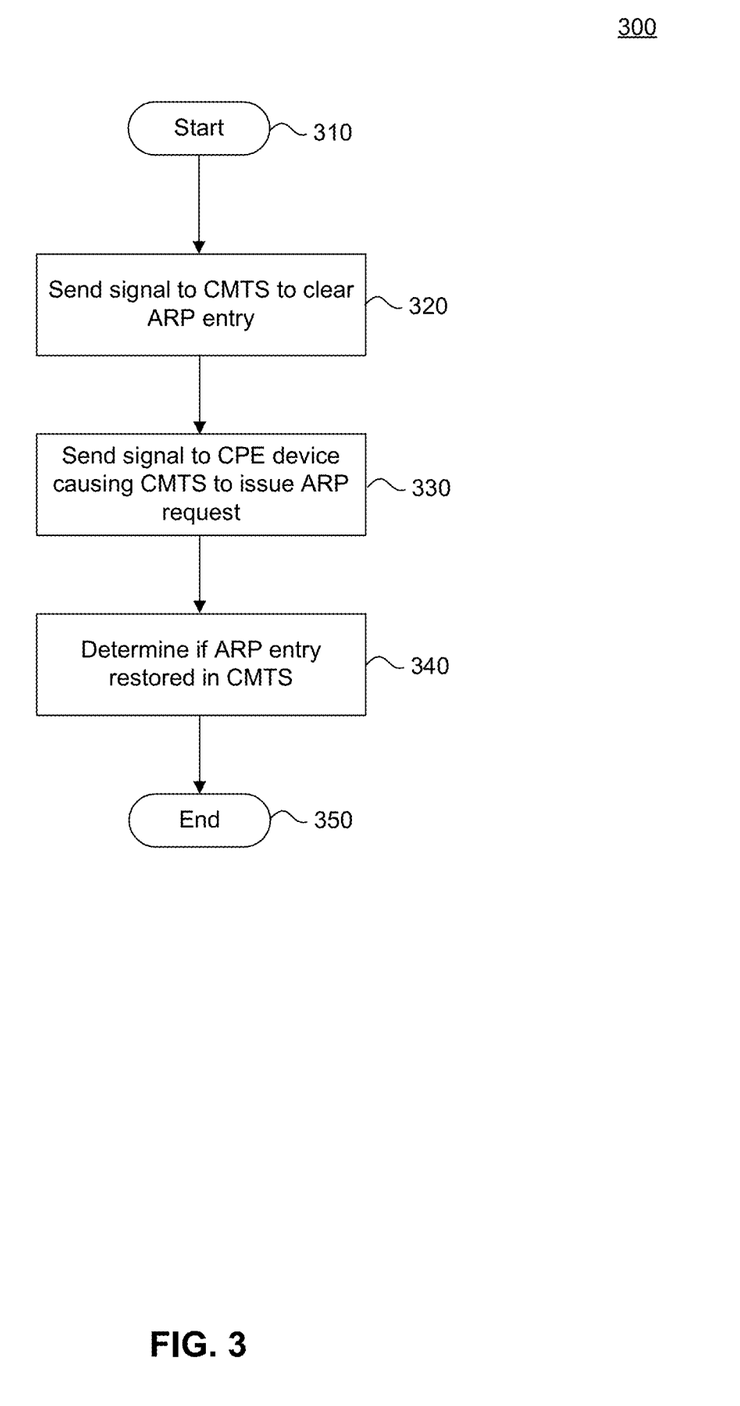
FIG. 3 illustrates a method for verifying the responsiveness of a CPE device according to an embodiment.

FIG. 3 illustrates details of a method 300 for verifying the responsiveness of a CPE device according to an embodiment. In particular, method 300 verifies the responsiveness of a CPE device at the data link layer (e.g., OSI layer 2, or MAC layer). It is to be appreciated that operations in method 300 may be performed in a different order than shown, and method 300 may not include all operations shown. Method 300 may be implemented by software, firmware, hardware, or a combination thereof. FIG. 5 described below, illustrates an example computer system 500 in which some embodiments such as method 300, or portions thereof, may be implemented as computer-readable code. For ease of discussion, and without limitation, method 300 will be described in terms of elements shown in FIG. 1. In one example, system 100 may be used to perform method 300.

For example, method 300, or portions thereof, may be implemented on diagnostic server 105.

Method 300 begins at step 310 and proceeds to step 320.

In step 320, method 300 sends a signal to the CMTS associated with the non-responsive CPE device to clear the ARP entry associated with the non-responsive CPE device. As an example, method 300 sends a signal to CMTS 120 to clear the ARP entry associated with STB 150 that appears to be non-responsive.

In step 330, method 300 sends a signal to the non-responsive CPE device, e.g., a ping command, that causes the CMTS to issue an ARP request to the non-responsive CPE device. As an example, method 300 sends a signal such as a ping command to STB 150 that causes CMTS 120 to issue an ARP request to STB 150.

In step 340, method 300 determines if the ARP entry associated with the non-responsive CPE device in the CMTS has been restored. For example, method 300 may query the CMTS for the ARP entry associated with the non-responsive CPE device. If the ARP entry previously cleared in step 320 is now repopulated, then the CPE device is responsive at the data link layer. As an example, method 300 may query CMTS 120 for the ARP entry associated with STB 150. If the ARP entry now includes a MAC address for STB 150, then STB 150 is responsive at the data link layer.

In step 350, method 300 ends.

In the event that identifiers for a different CPE device was obtained in step 215 of FIG. 2 or step 415 of FIG. 4 below, method 300 proceeds accordingly for the different CPE device.

Figure 4:
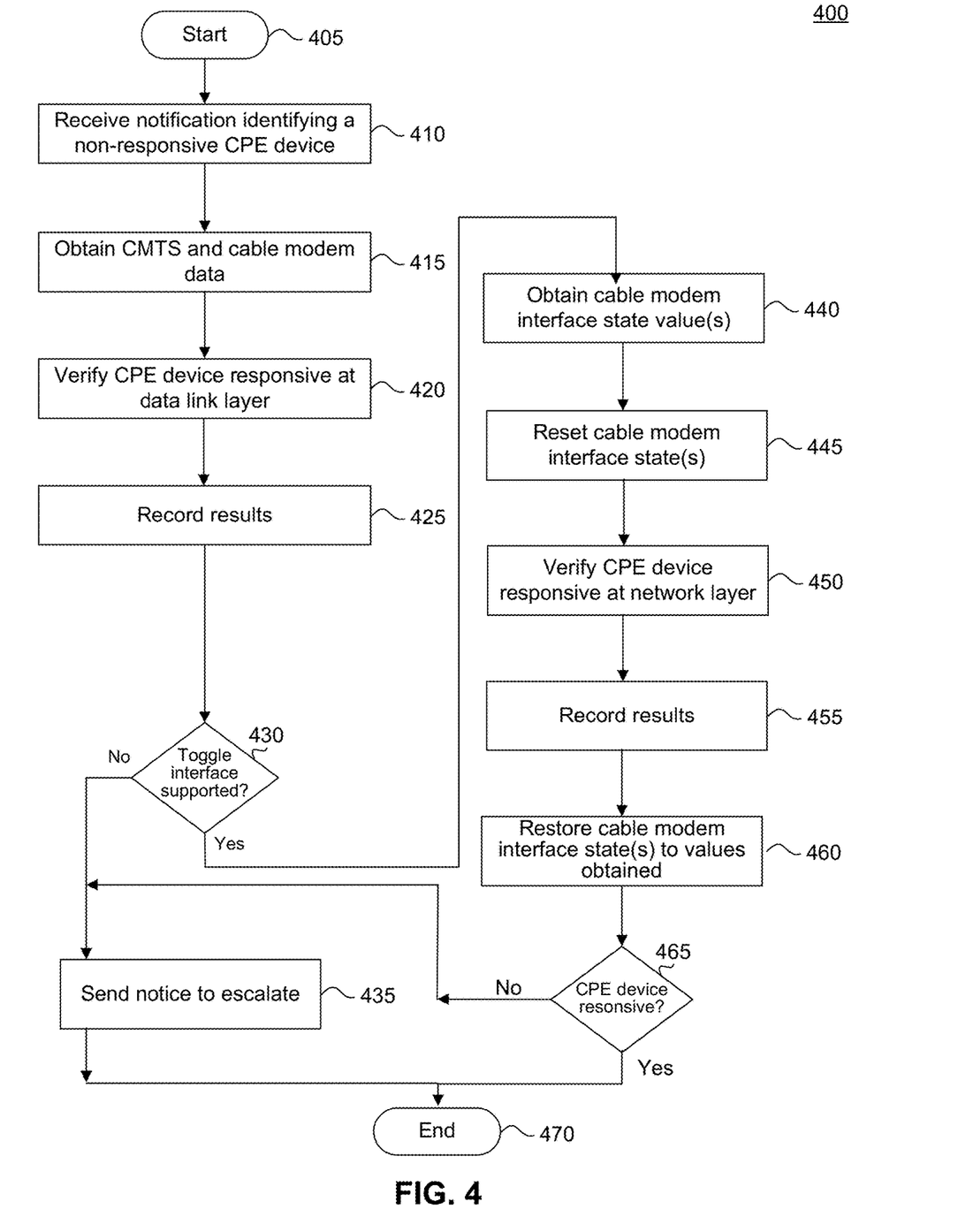
FIG. 4 illustrates a method demonstrating proactive integration according to an embodiment.

FIG. 4 illustrates a method 400 demonstrating proactive integration according to an embodiment. When a proactive integration is implemented according to an embodiment, a non-responsive CPE device may be detected and remediated without customer awareness of the assistance and/or CSRP interaction. For example, method 400 may detect and remediate a non-responsive CPE problem before a customer contacts a CSRP, and may not involve a CSRP if the CPE device becomes responsive. It is to be appreciated that operations in method 400 may be performed in a different order than shown, and method 400 may not include all operations shown. Method 400 may be implemented by software, firmware, hardware, or a combination thereof. FIG. 5 described below, illustrates an example computer system 500 in which some embodiments such as method 400, or portions thereof, may be implemented as computer-readable code. For ease of discussion, and without limitation, method 400 will be described in terms of elements shown in FIG. 1. In one example, system 100 may be used to perform method 400. For example, method 400, or portions thereof, may be implemented on diagnostic server 105.

Method 400 begins at step 405 and proceeds to step 410.

In step 410, method 400 receives a notification identifying a non-responsive CPE device and the cable modem associated with the non-responsive CPE device. A system may perform analysis and detect a non-responsive CPE device. The system may provide an identifier of the CPE device and an identifier of the associated cable modem in a notification to method 400, e.g., send the notice with the identifiers to method 400 implemented on diagnostic server 105. The system may be a DHCP system, a NOC monitoring system, or a security system on respective servers. For example, when a CPE device is connected to a cable modem, the CPE device may register with a first DHCP server. If the CPE device is moved from one location to a new geographic location, and registers with a different DHCP server, the first DHCP server may observe that an IP address has expired, e.g., an IP address lease expiration, and may generate and send a notification to method 400. As an example, a DHCP system on DHCP server 110 may perform a log analysis, and determine that an IP address for STB 150 associated with cable modem 125*a* has expired. DHCP server 110 may generate and send a notification including at least one of a MAC address or an IP address of STB 150 and a MAC address or an IP address of cable modem 125*a* to method 400 implemented on diagnostic server 105. In another example, an automatic configuration system on a server, e.g., a TR69 Automatic Configuration Server (not shown), may determine that a CPE device has not performed a periodic check-in, and may send a notification identifying the CPE device and the cable modem associated with the CPE device to method 400 implemented, for example, on diagnostic server 105.

In step 415, method 400 obtains CMTS and cable modem data. For example, using the cable modem identifier, method 400 may poll a bridge table of the cable modem to obtain information including but not limited to at least one of the following: identification of the CMTS associated with the non-responsive CPE device; detailed data about the type of the cable modem; a MAC address of the cable modem; an IP address of the cable modem; a MAC address of the non-responsive CPE device, or an IP address of the non-responsive CPE device. As an example, method 400 polls a bridge table in cable modem 125*a* to obtain at least one of an identifier for CMTS 120, detailed data about the type of cable modem that cable modem 125 is, an IP address or a MAC address for cable modem 125*a*, as well as an IP address or a MAC address for STB 150. Also, if a cable modem, e.g., cable modem 125*d*, also has an embedded MTA, then the results may also include a MAC address or an IP address of the MTA.

In addition, it is possible that a customer has replaced their CPE device with a different CPE device. When this occurs, the results of the bridge table poll may include a MAC address or an IP address of the different CPE device instead of the originally reported non-responsive CPE device. If this occurs, method 400 proceeds utilizing the obtained MAC or IP address of the different CPE device. For ease of discussion, and not a limitation, the remainder of method 400 is described assuming that the MAC and IP address of the originally reported non-responsive CPE device is obtained.

In step 420, method 400 verifies that the non-responsive CPE device, e.g., STB 150, is responsive at the data link layer (e.g., OSI layer 2 or MAC layer). Details of this step are described in FIG. 3 above.

In step 425, method 400 records the results of the data link layer verification. For example, method 400 may update an event record to indicate whether the CPE device is responsive at the data link layer. The indication may be the result of a query of an ARP table entry associated with the non-responsive CPE device includes a valid MAC address. Data is collected and recorded for data analysis and reports, e.g., for subsequent network management analysis. As an example, the indication may be the result of a query of the ARP table entry in CMTS 120 associated with STB 150 to determine if the entry includes a restored MAC address.

In step 430, using the detailed data about the type of the cable modem obtained in step 415, a determination is made whether the cable modem, e.g., cable modem 125*a*, supports a toggle interface feature. The detailed data about the type of the cable modem obtained in step 415, includes but not is not limited to a manufacturer, a make, a model number, a date, a software version, and/or a protocol standard. The detailed data about the cable modem is then compared with a table of information associated with cable modems that are known to support the toggle interface feature. For example, when there is a match in the table, the cable modem is recognized as a type of cable modem that supports the toggle interface feature.

The information in the table may be stored in a database in service operator network 103 and accessed by method 400, for example. The information in the table may be updated automatically, e.g., received from a network element in service operator network 103 that tests and determines whether a network endpoint such as a cable modem or ONU/ONT supports a toggle interface feature, or manually entered, e.g., via a network element console in service operator network 103. The information in the table may be a updated according to a programmable schedule, e.g., weekly, based on time of day, or on demand.

If the cable modem supports a toggle interface, e.g., a match is found between the detailed data about the cable modem and the information in the table, method 400 proceeds to step 440. If a toggle interface feature is not supported, e.g., a match is not found between the detailed data about the cable modem and the information in the table, method 400 proceeds to step 435.

In step 440, method 400 obtains the administrative state(s) of the cable modem interface(s) such as an Ethernet interface and/or USB interface. For example, method 400 may poll the cable modem associated with the non-responsive CPE device to capture the current value of an administrative state of at least one of an Ethernet interface or a USB interface of the cable modem. Since the cable modem supports the toggle interface feature, the administrative state(s) of the interface(s) may be in an enabled with a logical connection, or a disabled state with the logical connection being severed or dropped. As an example, method 400 may poll cable modem 125*a* to capture the current value of an administrative state(s) of the interface(s).

In step 445, method 400 resets the connection between the cable modem and the non-responsive CPE device. Method 400, e.g., implemented on diagnostic server 105, may send a disable toggle signal to disable an interface in the cable modem to which the non-responsive CPE device is connected. In response to receiving the disable toggle signal, an administrative state of the interface of the cable modem is disabled, and the cable modem stops sending and receiving data traffic, e.g., data packets, over the interface to and from the CPE device. In addition, the cable modem severs the logical connection between the cable modem and the CPE device, e.g., the cable modem stops sending signals such as Fast Link Pulse (FLP) signals to the CPE device. Even though the CPE device is physically connected to the interface of the cable modem, the interface of the cable modem is disabled, the logical connection is dropped, and the customer will not receive services. In another embodiment, method 400 may include one process that sends a disable toggle signal, waits a settable time period, and then sends an enable toggle signal to the cable modem.

After a settable time period, e.g., 20 seconds, method 400 may send an enable toggle signal to the cable modem. In response to receiving the enable toggle signal, the administrative state of the interface of the cable modem is set to enabled and the cable modem supports a logical reconnection, e.g., the cable modem may resume sending FLP signals over the interface to the CPE device causing the CPE device to reinitialize the logical connection with the cable modem. Once the connection is re-established, the CPE device may resume sending data traffic to and from the cable modem. For example, the CPE device may follow DHCP DORA procedures to obtain a new IP address from DHCP server 110 in service operator network 103 to send and receive data traffic.

As an example, method 400 may send a disable toggle signal to cable modem 125*a* to disable the state of an Ethernet interface or a USB interface to which STB 150 is connected, and drop the logical connection between cable modem 125*a* and STB 150. After a period of time, method 200 may send an enable toggle signal to cable modem 125*a* to enable the state of the interface and make a logical reconnection with STB 150. For example, STB 150 may request and obtain a new IP address, from DHCP server 110.

In step 450, method 400 verifies responsiveness of the CPE device at a network layer (e.g., OSI layer 3, or Internet layer). For example, method 400 may query a system including but not limited to a DHCP system, to obtain a valid IP address associated with the non-responsive CPE device. If a valid IP address is obtained, the CPE device is responsive at the network layer. As an example, method 400 may query a DHCP system on DHCP server 110 to determine if STB 150 is associated with a valid IP address. Other examples of systems include but are not limited to a Dynamic Host Configuration Protocol (DHCP) system, a Network Operations Center monitoring system, or a security system.

In step 455, method 400 records the records the results of the network layer verification, e.g., update an event record to indicate whether the CPE device is responsive at the network layer. Data is collected and recorded for data analysis and reports, e.g., for subsequent network management analysis. The records may include at least one of the following: a MAC address of the cable modem; a MAC address of the CPE device; an IP address of the cable modem; an IP address of the CPE device; an IP address of the CMTS; a length of time that an IP address of the CPE device has been valid, e.g., lease time of the IP address of the CPE device; a date and time that the result of the query is received; an indication of whether the cable modem supports the toggle interface feature; or a fully FQDN of the CPE device that uniquely identifies the CPE device. As an example, the records may include at least one of the MAC address or the IP address of cable modem 125*a*, the MAC address or the IP address of STB 150, or a length of time that an IP address of STB 150 has been valid, e.g., the lease time for the IP address of STB 150, the date and time the result of the query in step 450 is received, an indication of whether cable modem 125*a* supports the toggle interface feature, or the FQDN of the STB 150.

In step 460, method 400 restores the administrative state of at least one or both of the Ethernet interface or the USB interface to the value obtained in step 440. While method 400 may assist with diagnosing and remediating a non-responsive CPE device, the administrative state of the cable modem's interfaces may be set based on a billing/payment issue. Therefore, method 400 will return the administrative state to the value obtained in step 440. If for example, the administrative state value obtained in step 440 was disabled, method 400 will return the interface administrative states to disabled. As an example, method 400 restores the administrative state(s) of the interface(s) of cable modem 125*a* to the value obtained in step 440.

In step 465, a determination is made whether the CPE device, e.g., STB 150, is responding. For example, if a valid IP address was obtained in step 450, the CPE device is responsive at the network layer. If a valid IP address was not obtained in step 450, then the CPE device is not responsive at the network layer. If the CPE device is responsive at the network layer, method 400 proceeds to step 470 and ends. If the CPE device is not responsive, method 400 continues to step 435.

In step 435, method 400 sends a notice to escalate the problem. At this point the problem may be escalated to another level of assistance. For example, when the CPE device is not responsive, method 400 may send a notice identifying the non-responsive CPE to have the trouble escalated. The escalation may include standard procedures including, for example, contacting the customer to provide assistance, or scheduling a technician to visit the customer.

In step 470, method 400 ends.

Various aspects of the disclosure can be implemented by software, firmware, hardware, or a combination thereof. FIG. 5 illustrates an example computer system 500 in which some embodiments, or portions thereof, can be implemented as computer-readable code. For example, the methods 200-400, of FIGS. 2 through 4 can be implemented in system 500. Various embodiments are described in terms of the example computer system 500. After reading this description, it will become apparent to a person skilled in the relevant art how to implement the embodiments using other computer systems and/or computer architectures.

Computer system 500 includes one or more processors, such as processor 504. Processor 504 may comprise suitable logic, circuitry, dedicated circuits, and/or code that may enable processing data and/or controlling operations of computer system 500. Processor 504 can be a special purpose or a general purpose processor. Processor 504 is connected to a communication infrastructure 506 (for example, a bus or network). Processor 504 may be enabled to provide control signals to the various other portions of computer system 500 via communication infrastructure 506, for example.

Computer system 500 also includes a main memory 508, and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the embodiments as discussed herein. In particular, the computer programs, when executed, enable processor 504 to implement the disclosed processes, such as the steps in the methods 200-400 of FIGS. 2-4 as discussed above. Accordingly, such computer programs represent controllers of the computer system 500. Where the embodiments are implemented using software, the software may be stored in a computer program product and loaded into computer system 500 using removable storage drive 514, interface 520, hard drive 512 or communications interface 524. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A method, comprising:
   receiving a notification identifying a non-responsive customer premise equipment (CPE) device and a cable modem associated with the CPE device;
   requesting an identification of a cable modem termination system (CMTS) associated with the CPE device;
   determining that the cable modem supports a toggle interface feature;
   verifying responsiveness of the CPE device at a data link layer, the verifying comprising:
      instructing the CMTS to clear an Address Resolution Protocol (ARP) entry associated with the CPE device;
      sending a signal to the CPE device that causes the CMTS to issue an ARP request to the CPE device; and
      querying the CMTS to determine whether the ARP entry associated with the CPE device has been restored; and
   updating an event record to indicate whether the CPE device is responsive at the data link layer, wherein the updating comprises recording at least one of a media access control (MAC) address of the cable modem, a MAC address of the CPE device, an Internet Protocol (IP) address of the cable modem, an IP address of the CPE device, an IP address of the CMTS, a lease time for the IP address of the CPE device, an indication of whether the cable modem supports the toggle interface feature, or a fully qualified domain name (FQDN) of the CPE device.

2. The method of claim 1, further comprising:
   verifying responsiveness of the CPE device at a network layer;
   updating the event record to indicate whether the CPE device is responsive at the network layer; and
   restoring an administrative state of at least one of an Ethernet interface or a USB interface.

3. The method of claim 2, wherein the verifying comprises querying a system that sent the notification to obtain a valid IP address associated with the CPE device.

4. The method of claim 2, further comprising:
   determining that the CPE device is not responsive; and
   contacting a customer corresponding to the non-responsive CPE device, or scheduling a technician to visit the customer corresponding to the non-responsive CPE device.

5. The method of claim 1, wherein the notification is received from at least one of a Dynamic Host Configuration Protocol (DHCP) system, a Network Operations Center monitoring system, a security system, an automatic configuration system, or a customer service representative.

6. The method of claim 1, wherein the requesting comprises: polling the cable modem to obtain: the MAC address of the cable modem, the IP address of the cable modem, the MAC address of the CPE device, or the IP address of the CPE device.

7. The method of claim 1, wherein the determining that the cable modem supports the toggle interface feature comprises:
   obtaining detailed data about the cable modem; and
   comparing the detailed data with a table of information associated with cable modems that support the toggle interface feature.

8. The method of claim 7, wherein the detailed data about the cable modem comprises: a manufacturer, a make, a model number, a date, a software version, or a protocol standard.

9. A non-transitory computer readable medium carrying one or more sequences of one or more instructions for execution by one or more processors to perform operations, comprising:
   receiving a notification identifying a non-responsive customer premise equipment (CPE) device and a cable modem associated with the CPE device;
   requesting an identification of a cable modem termination system (CMTS) associated with the CPE device;
   determining that the cable modem supports a toggle interface feature;
   verifying responsiveness of the CPE device at a data link layer, the verifying comprising:
      instructing the CMTS to clear an Address Resolution Protocol (ARP) entry associated with the CPE device;
      sending a signal to the CPE device that causes the CMTS to issue an ARP request to the CPE device; and querying the CMTS to determine whether the ARP entry associated with the CPE device has been restored; and updating an event record to indicate whether the CPE device is responsive at the data link layer, wherein the updating comprises recording at least one of a media access control (MAC) address of the cable modem, a MAC address of the CPE device, an Internet Protocol (IP) address of the cable modem, an IP address of the CPE device, an IP address of the CMTS, a lease time for the IP address of the CPE device, an indication of whether the cable modem supports the toggle interface feature, or a fully qualified domain name (FQDN) of the CPE device.

10. The non-transitory computer readable medium of claim 9, the operations further comprising:
verifying responsiveness of the CPE device at a network layer;
updating the event record to indicate whether the CPE device is responsive at the network layer; and
restoring an administrative state of at least one of an Ethernet interface or a USB interface.

11. The non-transitory computer readable medium of claim 10, wherein the verifying comprises querying a system that sent the notification to obtain a valid IP address associated with the CPE device.

12. The non-transitory computer readable medium of claim 10, the operations further comprising:
determining that the CPE device is not responsive; and
contacting a customer corresponding to the non-responsive CPE device, or scheduling a technician to visit the customer corresponding to the non-responsive CPE device.

13. The non-transitory computer readable medium of claim 9, wherein the notification is received from at least one of a Dynamic Host Configuration Protocol (DHCP) system, a Network Operations Center monitoring system, a security system, an automatic configuration system, or a customer service representative.

14. The non-transitory computer readable medium of claim 9, wherein the requesting comprises: polling the cable modem to obtain: the MAC address of the cable modem, the IP address of the cable modem, the MAC address of the CPE device, or the IP address of the CPE device.

15. A system, comprising:
a memory; and
a processor coupled to the memory, configured to:
receive a notification identifying a non-responsive customer premise equipment (CPE) device and a cable modem associated with the CPE device;
request an identification of a cable modem termination system (CMTS) associated with the CPE device;
determine that the cable modem supports a toggle interface feature;
verify responsiveness of the CPE device at a data link layer, wherein to verify, the processor is configured to:
instruct the CMTS to clear an Address Resolution Protocol (ARP) entry associated with the CPE device;
send a signal to the CPE device that causes the CMTS to issue an ARP request to the CPE device; and
query the CMTS to determine whether the ARP entry associated with the CPE device has been restored; and
update an event record to indicate whether the CPE device is responsive at the data link layer, wherein the updating comprises recording at least one of a media access control (MAC) address of the cable modem, a MAC address of the CPE device, an Internet Protocol (IP) address of the cable modem, an IP address of the CPE device, an IP address of the CMTS, a lease time for the IP address of the CPE device, an indication of whether the cable modem supports the toggle interface feature, or a fully qualified domain name (FQDN) of the CPE device.

16. The system of claim 15, wherein the processor is further configured to:
verify responsiveness of the CPE device at a network layer;
update the event record to indicate whether the CPE device is responsive at the network layer; and
restore an administrative state of at least one of an Ethernet interface or a USB interface.

17. The system of claim 16, wherein to verify the processor is configured to query a system that sent the notification to obtain a valid IP address associated with the CPE device.

18. The system of claim 16, wherein the processor is further configured to:
determine that the CPE device is not responsive; and
contact a customer corresponding to the non-responsive CPE device, or scheduling a technician to visit the customer corresponding to the non-responsive CPE device.

19. The system of claim 15, wherein the notification is received from at least one of a Dynamic Host Configuration Protocol (DHCP) system, a Network Operations Center monitoring system, a security system, an automatic configuration system, or a customer service representative.

20. The system of claim 15, wherein to request, the processor is configured to poll the cable modem to obtain: the MAC address of the cable modem, the IP address of the cable modem, the MAC address of the CPE device, or the IP address of the CPE device.

* * * * *